United States Patent
Jones et al.

(10) Patent No.: US 9,575,280 B2
(45) Date of Patent: Feb. 21, 2017

(54) MOUNTING AN OPTICAL COMPONENT IN AN OPTICAL ARRANGEMENT

(71) Applicant: Qioptiq Limited, Denbighshire (GB)

(72) Inventors: David A Jones, Denbigshire (GB); Kenneth D Ball, Denbigshire (GB)

(73) Assignee: Qioptiq Limited, St. Asaph (GB)

( * ) Notice: Subject to any disclaimer, the term of this patent is extended or adjusted under 35 U.S.C. 154(b) by 377 days.

(21) Appl. No.: 13/934,869

(22) Filed: Jul. 3, 2013

(65) Prior Publication Data
US 2014/0063632 A1    Mar. 6, 2014

(30) Foreign Application Priority Data
Jul. 6, 2012 (GB) .................................. 1212139.8

(51) Int. Cl.
*G02B 7/00* (2006.01)
*G02B 7/02* (2006.01)

(52) U.S. Cl.
CPC .................. *G02B 7/00* (2013.01); *G02B 7/025* (2013.01); *G02B 7/026* (2013.01); *G02B 7/027* (2013.01)

(58) Field of Classification Search
CPC ........... F21V 21/04; G02B 7/025; G02B 7/00; G02B 7/026; G02B 7/027; G08B 13/19632
(Continued)

(56) References Cited

U.S. PATENT DOCUMENTS 5,159,188 A * 10/1992 Abe ...................... H04B 10/60
                                                          250/216
5,493,452 A *  2/1996 Hoshino et al. ............ 359/819
(Continued)

FOREIGN PATENT DOCUMENTS

GB           2442682           4/2008
JP      WO 2007043396 A1 *     4/2007 ............. G03B 17/02
(Continued)

OTHER PUBLICATIONS

GB Search Report issued on Oct. 31, 2012 for GB 1212139.8, 3 pages.

*Primary Examiner* — Bumsuk Won
*Assistant Examiner* — Grant Gagnon
(74) *Attorney, Agent, or Firm* — Peter A. Nieves; Sheehan Phinney Bass & Green PA

(57) ABSTRACT

There is disclosed a system and associated method for mounting an optical component in an optical arrangement. An optical component (1) is provided having a circular edge region (5). A mount (9) having a circular wall is also provided, the circular wall being configured for radially-spaced cooperation with the circular edge region of the optical component. The system is configured such that one of said circular edge region (5) and said circular wall (17) has a plurality of spaced-apart protrusions (23) provided around it. The other of the circular edge region (5) and the circular wall (17) has a plurality of spaced-apart recesses provided around it. The protrusions (23) and the recesses (7) are configured such that each protrusion (23) may be aligned with a respective recess (7) and engaged within said recess (7) via relative rotation between the optical component (1) and the mount (9). The system further includes an adhesive (32) for application between said circular edge region (5) and said circular wall (17) to adhesively fix the optical component (1) in position relative to the mount (9).

46 Claims, 4 Drawing Sheets

(58) Field of Classification Search
USPC .......................... 359/819, 830, 831, 871, 894
See application file for complete search history.

(56) References Cited

U.S. PATENT DOCUMENTS

| | | |
|---|---|---|
| 2004/0057717 A1* | 3/2004 | Arbuckle et al. .............. 396/427 |
| 2012/0049026 A1* | 3/2012 | Rangaswamy ........ G02B 7/028 248/309.1 |
| 2012/0105985 A1 | 5/2012 | Kang |
| 2012/0312913 A1* | 12/2012 | Eckhardt ............... F41G 7/2213 244/3.16 |

FOREIGN PATENT DOCUMENTS

| | | | |
|---|---|---|---|
| JP | 2009169382 | | 7/2009 |
| WO | 97/05586 | | 2/1997 |
| WO | 2006/012524 | | 2/2006 |
| WO | WO 2006/012524 | * | 2/2006 |

* cited by examiner

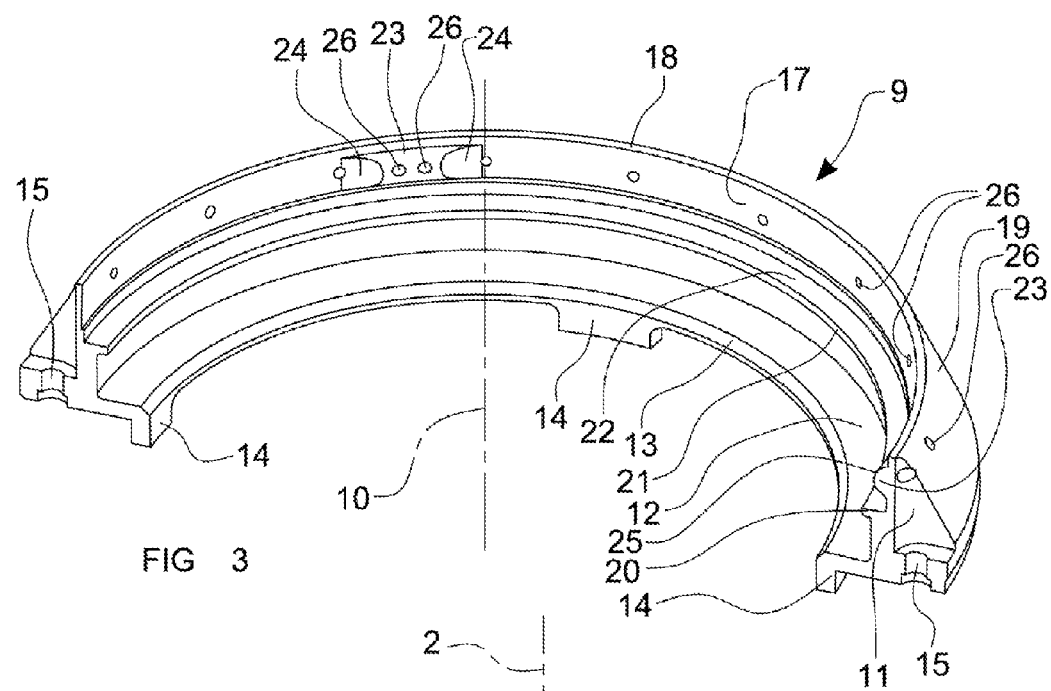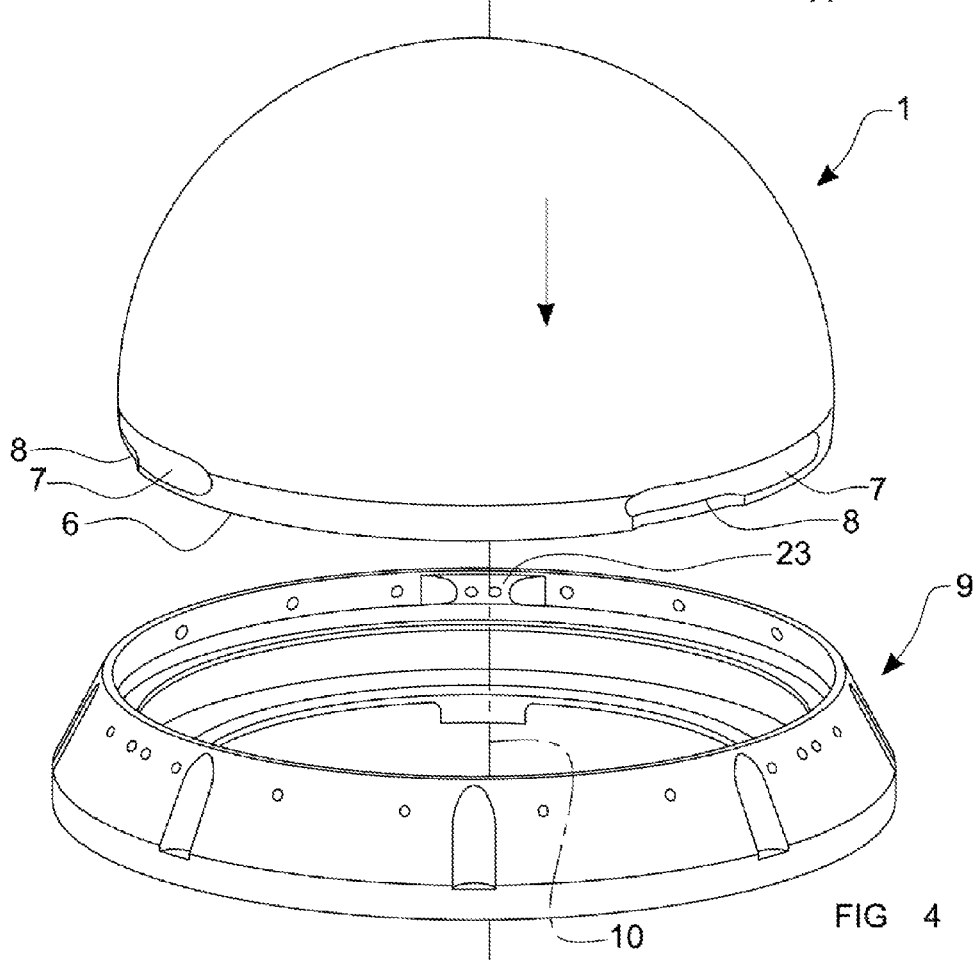

MOUNTING AN OPTICAL COMPONENT IN AN OPTICAL ARRANGEMENT

The present invention relates to a system and a method for mounting an optical component in an optical arrangement.

In the field of high-accuracy optics, it can often be difficult to mount optical components, such as hemispherical domes in particular, in an optical arrangement with sufficient accuracy and security. Optical components in the form of hemispherical domes are commonly used in defence applications such as missile guidance systems and infrared countermeasures systems, and as such are required to provide extremely high performance in some very extreme environments and under extreme conditions. It is therefore important that such components are mounted extremely accurately and securely and in a manner which will not subject the component to potentially damaging stresses. It is also often important in such installations that the dome is mounted so as to present an optically clear aperture. This usually necessitates the inner edge surface of the dome being optically consistent with the rest of the dome's inner surface and hence clear of obstruction or any mechanical mounting arrangements.

It has become common for domes and other optical components to be fixed in position within component mounts via the use of adhesive rather than via more complicated mechanical mounting arrangements. Often there is simply insufficient available space to provide mechanical mounting arrangements configured to provide positive retention whilst also maintaining a clear optical aperture to the dome. However, with this type of mounting arrangement, if the adhesive suffers failure in service then the dome or other optical component will become loose.

It has therefore been proposed to mount domes and other optical components via the use of mechanical mounting arrangements. For example, a mount may be provided into which the edge of the dome is received, and then additional mounting members are added to the assembly to retain the dome in position relative to the mount. Typical mounting arrangements of this type provide positive retention of the dome or other optical component, but are disadvantageous in the sense that they tend to be intricate and complicated mechanical arrangements involving the use components or formations which can induce undesirable localised stresses in the fragile optical dome. Another problem with this sort of mounting arrangement is the additional space required and the additional mass of the overall assembly.

It is a preferred object of the present invention to provide an improved system for mounting an optical component in an optical arrangement.

It is another preferred object of the present invention to provide an improved method of mounting an optical component in an optical arrangement.

According to a first aspect of the present invention, there is provided a system for mounting an optical component in an optical arrangement; the system comprising: an optical component having a circular edge region; and a mount having a circular wall configured for radially-spaced cooperation with said circular edge region; the system being configured such that one of said circular edge region and said circular wall has a plurality of spaced-apart protrusions provided around it; and the other of said circular edge region and said circular wall has a plurality of spaced-apart recesses provided around it, wherein said protrusions and said recesses are configured such that each protrusion may be aligned with a respective recess and engaged within said recess via relative rotation between said optical component and said mount; the system further including an adhesive for application between said circular edge region and said circular wall to adhesively fix the optical component in position relative to the mount.

Preferably, at least one of said circular edge region of the optical component and said circular wall of the mount has a plurality of flow ports formed therethrough for the injection of said adhesive between said circular edge region and said circular wall.

Advantageously, each said protrusion is smaller in radial cross-section than the radial cross-section of the respective recess, such that a radial gap is created between the recess and the protrusion upon said relative rotation, said adhesive being provided to fill said radial gap.

Conveniently, each said protrusion and each said recess is substantially curved or arcuate in radial cross-section.

Preferably, each said radial gap is generally curved or arcuate in radial cross-section.

Advantageously, said recesses are provided in said edge-region of the optical component, and said protrusions are provided on said circular wall of the mount.

Conveniently, said recesses are provided in a radially outwardly directed surface of the optical component, and said protrusions project radially inwardly from said circular wall.

Preferably, said recesses are spaced from a circular edge of said edge region, and each recess is associated with a respective recessed access channel formed in said edge region and extending from said circular edge to the recess, each access channel being configured to permit the passage of a respective said protrusion upon relative axial movement of the optical component and mount towards one another, to thereby align the protrusions with said recesses.

Advantageously, said mount defines a support surface configured to be spaced from said circular edge of the edge region by said adhesive.

Conveniently, said circular wall defines a circular edge arranged to be spaced from a surface of said optical component by an annular gap, the system further comprising a sealant to fill said gap and protect said adhesive between the circular edge region and the circular wall Preferably, said optical component is a dome. The dome may optionally be a hemispherical dome. Alternatively, the dome could be an aspherical dome.

In alternative embodiments of the invention, the optical component can be a lens and/or may have a conical shape.

Advantageously, the inner surface of said dome is free of recesses or protrusions in said edge region.

Conveniently, said adhesive is substantially incompressible when cured. However, it is to be appreciated that other types of adhesive could be used instead, which have compressible properties.

According to another aspect of the present invention, there is provided a method of mounting an optical component in an optical arrangement, the method comprising the steps of: providing an optical component having a circular edge region, and a mount having a circular wall configured for radially-spaced cooperation with said circular edge region, wherein one of said circular edge region and said circular wall has a plurality of spaced-apart protrusions provided around it, and the other of said circular edge region and said circular wall has a plurality of spaced-apart recesses provided around it; aligning each said protrusion with a respective said recess; and rotating either said optical component or said mount to cause relative rotation between said optical component and said mount, said rotation being effective to engage each said protrusion within a respective said recess; applying adhesive between said circular edge region and said circular wall; and at least partially curing said adhesive to fix the optical component in position relative to the mount.

Preferably, said step of applying adhesive between the circular edge region and said circular wall is performed after said step of rotating either said optical component or said mount to engage each said protrusion within a respective said recess.

Advantageously, said step of applying adhesive involves injecting said adhesive between said circular edge region and said circular wall through a plurality of flow ports formed through at least one of said circular edge region and said circular wall.

Preferably, the method further comprises the step of centering the circular edge region with respect to the circular wall to define an annular gap of uniform thickness between the circular edge region and the circular wall prior to said step of at least partially curing the adhesive.

Advantageously, said step of centering the circular edge region with respect to the circular wall is performed prior to said step of applying the adhesive between the circular edge region and the circular wall, said adhesive being applied in said annular gap.

Conveniently, each said protrusion is smaller in radial cross-section than the radial cross-section of the respective recess, and wherein said step of rotating either said optical component or said mount to cause relative rotation between said optical component and said mount involves the creation of a radial gap between each recess and its respective protrusion upon said relative rotation, said step of applying adhesive involving filling each said radial gap with adhesive.

Preferably, each said protrusion and each said recess is substantially curved or arcuate in radial cross-section.

Advantageously, each said radial gap is generally curved or arcuate in radial cross-section.

Conveniently, the method includes providing said recesses in the edge region of the optical component and said protrusions on the circular wall of the mount.

Preferably, the method includes providing said recesses in a radially outwardly directed surface of the optical component, and said protrusions projecting inwardly from the circular wall of the mount.

Advantageously, the method includes providing said recesses in spaced relation to a circular edge of said edge region, each recess being associated with a respective recessed access channel formed in said edge region and extending from said circular edge to the recess, the method further involving moving the optical component and the mount axially towards one another such that each access channel permits the passage of a respective said protrusion, thereby aligning the protrusions with respective recesses.

Preferably, said mount defines a support surface, said step of moving the optical component and the mount axially towards one another involves spacing the support surface from said circular edge of the edge region; and wherein said step of applying the adhesive involves the application of said adhesive between said support surface and said circular edge of the edge region.

Conveniently, said mount defines a support surface, and wherein the support surface is spaced from said circular edge of the edge region by said adhesive.

Preferably, said circular wall defines a circular edge, and wherein the method involves spacing said circular edge from a surface of the optical component by an annular gap, and filling said annular gap with a sealant to protect the adhesive between the circular edge region and the circular wall.

Advantageously, the method includes providing said optical component in the form of a dome. The dome may optionally be a hemispherical dome. Alternatively, the dome may be an aspherical dome.

In alternative embodiments, the optical component can be a lens and/or of conical shape.

Preferably, the inner surface of said dome is free of recesses or protrusions in said edge region.

Advantageously, said adhesive is substantially uncompressible when cured. However, it is to be appreciated that alternative forms of adhesive could be used instead.

So that the invention may be more readily understood, and so that further features thereof may be appreciated, embodiments of the invention will now be described by way of example with reference to the accompanying drawings in which:

FIG. 3 is a part-sectional view of the mount shown in FIG. 3;

FIG. 4 is a perspective view showing the hemispherical dome and the mount being moved axially towards one another for connection;

Figure 1:
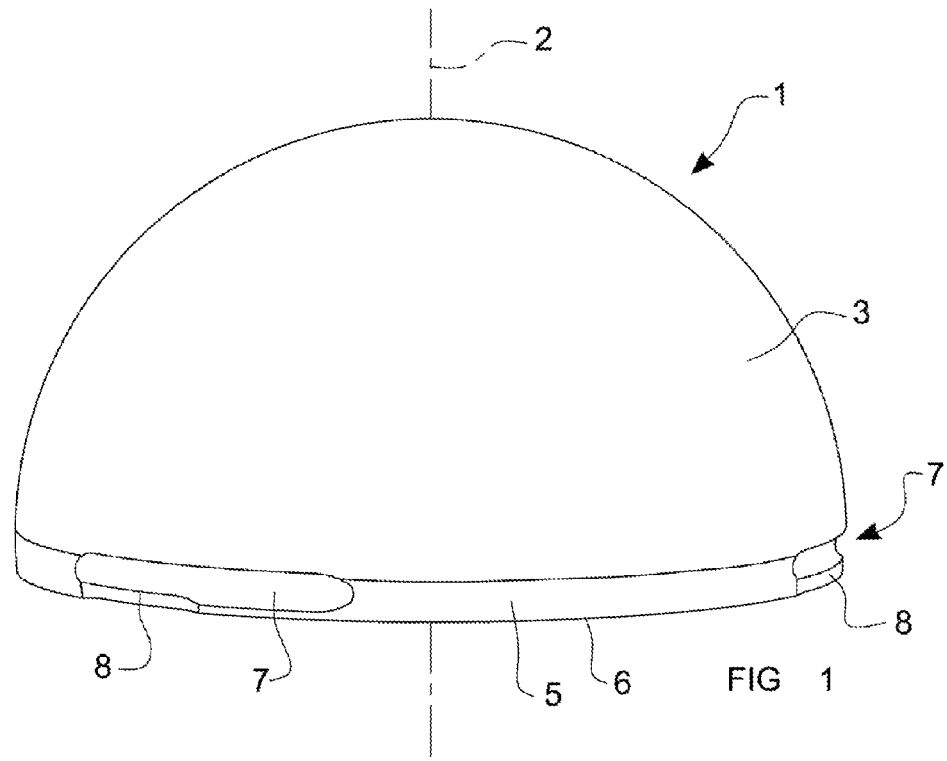
FIG. 1 is a perspective view of an optical component in the form of a hemispherical dome in accordance with an embodiment of the present invention.

Turning now to consider the drawings in more detail, FIG. 1 shows an optical component 1 forming part of the system of the present invention. The particular component illustrated takes the form of a dome which is substantially hemispherical about a primary axis 2, as is commonly known in the general field of high-accuracy optics, and will thus typically be made of glass or a similar material. The dome 1 is of substantially uniform thickness and presents a hemispherical outer convex surface 3 and a hemispherical inner concave surface 4 (not visible in FIG. 1).

The dome component 1 has a circular edge region 5 around its lower periphery (in the orientation shown in FIG. 1), which terminates in a circular edge 6. It is envisaged that the hemispherical inner surface 4 of the dome will extend over the inner side of the circular edge region 5 without any (or at least without significant) discontinuity or deviation so as to be optically consistent with the rest of the dome's inner surface 4.

It is important to note, however, that whilst the invention is described herein with particular reference to an optical component 1 in the form of a hemispherical dome, the optical component 1 could take alternative forms without departing from the scope of the present invention. For example, the optical component could instead take the form of an aspheric dome, or even a cylindrical component. It is proposed, however, that whatever the form of the optical component, it will have a circular edge region 5 terminating in a circular edge 6 in a similar manner to the dome illustrated in FIG. 1.

The circular edge region 5 of the dome 1 is provided with a plurality of spaced-apart recesses 7 around its outer periphery, each recess being formed in the material of the dome and extending inwardly from the radially outwardly directed outer surface 3 of the dome. In the particular arrangement illustrated, the dome has three such recesses 7 provided at substantially equi-spaced positions around the outside of the edge region 5. However, it is to be appreciated that alternative embodiments could have fewer or more recesses 7, either in equi-spaced relationship to one another or spaced irregularly from one another.

Each recess 7 is generally elongate and thus extends around a portion of the outer periphery of the edge region 5 of the dome 1. In the particular arrangement illustrated, the three recesses 7 are each of substantially equal length, although again it is to be appreciated that this characteristic is not an essential feature, and in other embodiments the recesses 7 could be of different lengths.

As best illustrated in respect of the recess 7 at the right hand side of FIG. 1, each recess 7 defines a concavity extending inwardly of the dome thickness from its outer surface 3. Each recess 7 is thus substantially curved or arcuate in radial cross-section relative to the primary axis 2 of the dome 1. This curved or arcuate profile extends along substantially the entire length of each recess.

The elongate recesses 7 are each spaced a small distance above the extreme lower circular edge 6 of the dome 1. As best illustrated in respect of the recess 7 at the left hand side of FIG. 1, each recess is furthermore associated with a respective access channel 8 which is formed in the edge region 5 and which extends from the circular edge 6 to the respective recess 7. The access channels 8 are each provided at a corresponding end of their respective recesses 7.

It is to be appreciated that because the recesses 7 and their associated access channels 8 are each provided in the radially outwardly directed surface 3 of the dome 1, the radially inwardly directed convex surface 4 of the dome is uninterrupted or impaired by the recesses and access channels in the edge region 5 and is thus optically consistent over its entire extent, including the edge region 5 around the aperture of the dome 1.

Figure 2:
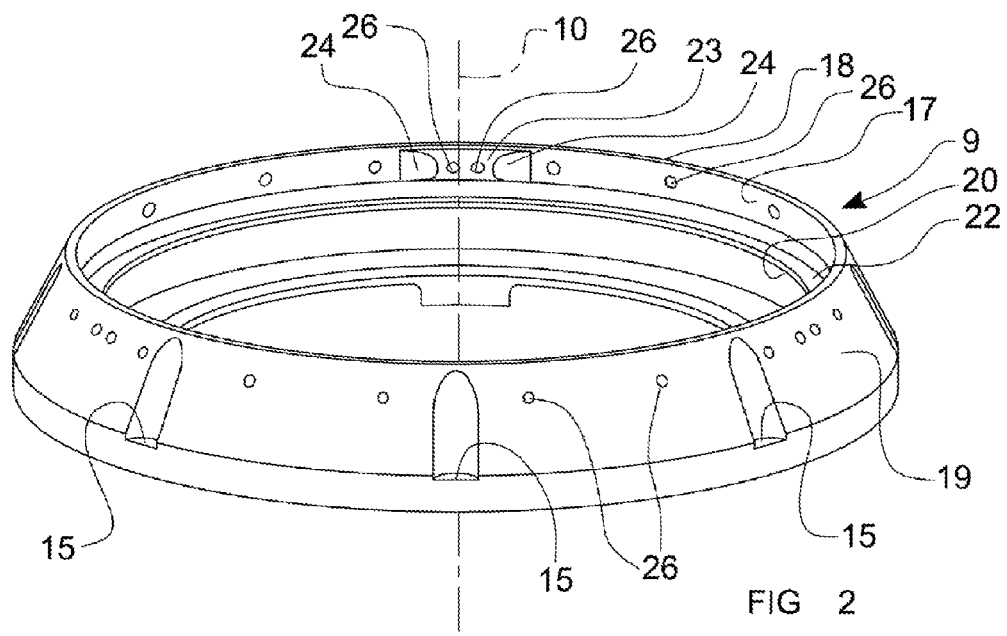
FIG. 2 is a perspective view of a mount for receipt of the hemispherical dome in accordance with an embodiment of the present invention.

Turning now to consider FIGS. 2 and 3, there is shown a mount 9 forming another part of the system of the present invention, the mount 9 being configured to receive and support the optical component (i.e. the dome) 1 as will be described below in detail.

The mount 9 is provided in the form of an annular ring having a primary axis 10. As illustrated most clearly in the cross-sectional view of FIG. 3, the mount 9 has a main annular support structure 11 which extends upwardly (in the orientation shown) from a main annular flange 12. The main flange 12 has a circular inner edge 13 from which depend a number of spaced-apart locating lugs 14 which are provided for engagement within corresponding apertures or recesses (not shown) in a larger optical arrangement or apparatus of which the optical dome 1 is intended to form a part and must therefore be securely mounted. A plurality of mounting apertures 15 are provided around the outside of the mount 9 for receipt of respective mounting bolts 16 (see FIG. 5) in order to securely fix the mount 9 in position in the larger optical arrangement or apparatus.

The support structure 11 of the mount 9 defines a circular wall 17 which is centred on the axis 10 and which presents a radially inwardly directed surface extending all of the way around the annular mount 9. The inner diameter of the circular wall 17 is preferably a few millimetres larger than the external diameter of the edge region 5 of the dome 1, for reasons which will be explained in more detail below. The circular wall 17 defines a circular edge 18 around the top of the support structure 11, and in the particular arrangement illustrated the support structure 11 presents an outwardly directed frustoconical surface 19 which extends outwardly from the upper edge 18 of the circular wall 17.

The support structure 11 further includes a support flange 20 which extends radially inwardly from the lower region of the circular wall 17 and which terminates with an inner edge 21 which is centred on the axis 10 and which has a diameter slightly less than the inner diameter of the circular wall 17. The support flange 20 thus presents an upwardly directed (in the orientation illustrated) support surface 22 of annular form and which has a radial thickness a few millimetres greater than the radial thickness of the dome 1.

The circular wall 17 of the mount 9 is provided with a plurality of spaced-apart protrusions 23 around its inner periphery, each protrusion projecting a short distance radially inwardly from the surface of the wall 17. The number of protrusions 23 provided around the circular wall 17 of the mount 9 is equal to the number of recesses 7 provided around the edge region 5 of the dome 1, and so in the particular arrangement illustrated three such protrusions 23 are provided around the wall 17 (not all being visible in the drawings). The protrusions 23 are provided at positions around the wall 17 which correspond to the positions at which the recesses 7 are provided around the edge region 5 of the dome 1.

Each protrusion 23 is generally elongate and thus extends around a portion of the inner periphery of the circular wall 17. In the particular arrangement illustrated, each protrusion 23 has a ramped portion 24 at each end to provide for a smooth transition between the inner surface of the wall 17 and the radially innermost surface of the protrusion 23.

As best illustrated in respect of the protrusion 23 at the right hand side of FIG. 3, each protrusion 23 is generally curved or arcuate in radial cross-section and thus presents a generally convex inwardly directed surface 25. It will of course be remembered that the recesses 7 provided around the edge region 5 of the dome are also generally curved or arcuate in radial cross-section and thus present respective concave outwardly directed surfaces. It is to be noted, however, that the protrusions 23 are smaller in radial cross-section than the radial cross-section of the recesses 7, the reason for which will become apparent hereinafter.

The mount 9 additionally includes a plurality of flow ports 26 which extend radially through the circular wall 17 at spaced-apart positions around the wall. As illustrated in FIGS. 2 and 3, some of the flow ports 26 extend through the protrusions 23.

Turning now to consider FIGS. 4 to 7, a method for mounting the optical dome 1 in an optical arrangement via the mount 9 will be described.

FIG. 1 shows the dome 1 positioned above the mount 9 such that the axis 2 of the dome 1 is coincident with the axis 10 of the mount; in other words the dome and the mount are arranged coaxially with respect to one another. The dome 1 and the mount 9 are arranged relative to one another such that each access channel 8 on the dome 1 is aligned vertically above a respective protrusion 23 on the mount 9. With the access channels 8 and the protrusions 23 aligned in this manner, the dome 1 and the mount 9 are then moved axially towards one another. This may be achieved, for example, either by lowering the dome 1 towards the mount 9 (as depicted by arrow 27 in FIG. 4), or by lifting the mount 9 towards the dome 1).

As the dome 1 and the mount 9 are moved together in this manner, the lower edge region 5 of the dome 1 moves inside the circular wall 17 of the mount, and also the protrusions 23 each pass through respective access channels 8 so as to become circumferentially aligned with respective recesses 7. Once the protrusions 23 and the recesses 7 have been aligned in this manner, either the mount 9 or the dome 1 or both are then rotated about their respective and coincident axes 2, 10 to cause relative rotation between the mount 9 and the dome 1. This rotation (as depicted by arrow 28 in FIG. 5) is effective to move each protrusion into loose engagement within a respective recess 7 as shown in FIG. 5.

Preferably, the circular edge region 5 of the dome 1 is centred with respect to the circular wall 7 of the mount 9 so as to define an annular gap 29 of uniform thickness between the edge region 5 of the dome 1 and the circular wall 17 of the mount 9. This gap 29 arises because the inner diameter of the circular wall 17 is preferably a few millimetres larger than the external diameter of the edge region 5 of the dome 1. The wall 17 is thus configured for radially-spaced cooperation with the edge region 5 of the dome during the step of rotating the dome 1 and the mount 9 relative to one another.

Figure 5:
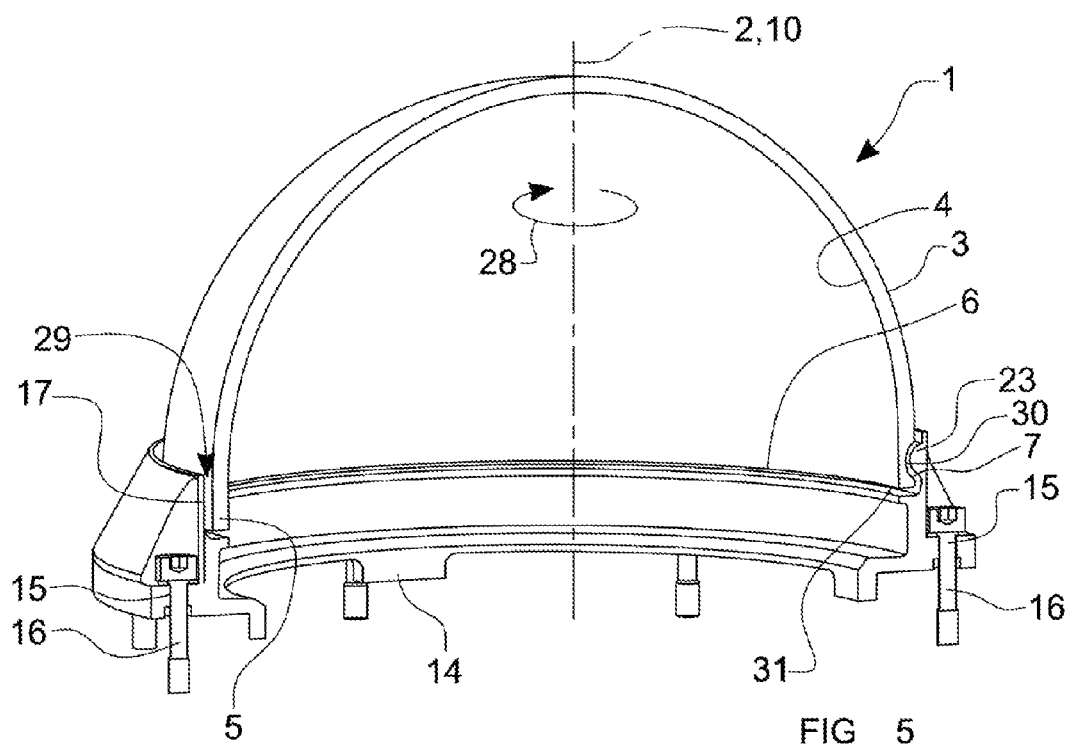
FIG. 5 is transverse cross-sectional view through the hemispherical dome and the mount following a subsequent connected step in which the two components are rotated relative to one another.

Having particular regard to the right hand side of FIG. 5, where a recess 7 and a corresponding engaging protrusion 23 are shown in radial cross-section, it will be noted that because the protrusions 23 are smaller in radial cross-section than the recesses 7, a small radial gap 30 is created between each recess 7 and its corresponding protrusion 23. Because of the curved or arcuate profile of the recesses 7 and the protrusions 23, these radial gaps are also generally curved in radial cross-section.

Following the above-mentioned step of rotationally engaging the protrusions 23 within respective recesses 7, and with the lower edge region 5 of the dome 1 still centred with respect to the circular wall 17 of the mount, the dome 1 is supported such that its lowermost peripheral edge 6 is spaced a few millimetres above the support surface 22 of the annular support flange 20 extending around the mount, thereby defining a small 31 gap between the edge 6 and the surface 22.

Figure 6:
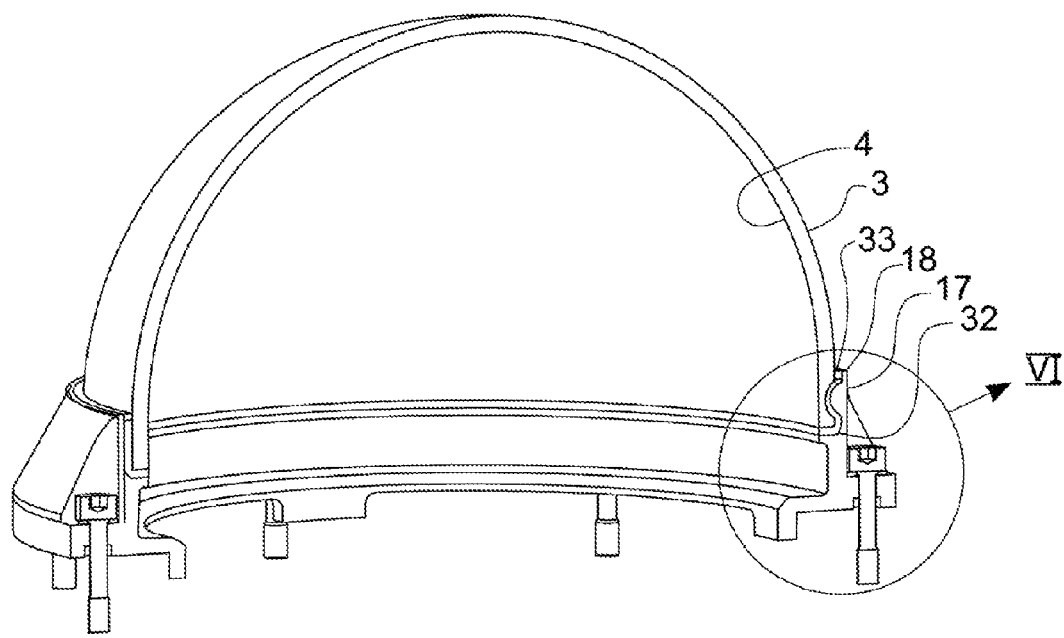
FIG. 6 is a view corresponding generally to that of FIG. 5, but which shows the arrangement after the application of a layer of adhesive between the hemispherical dome and a wall part of the mount.
Figure 7:
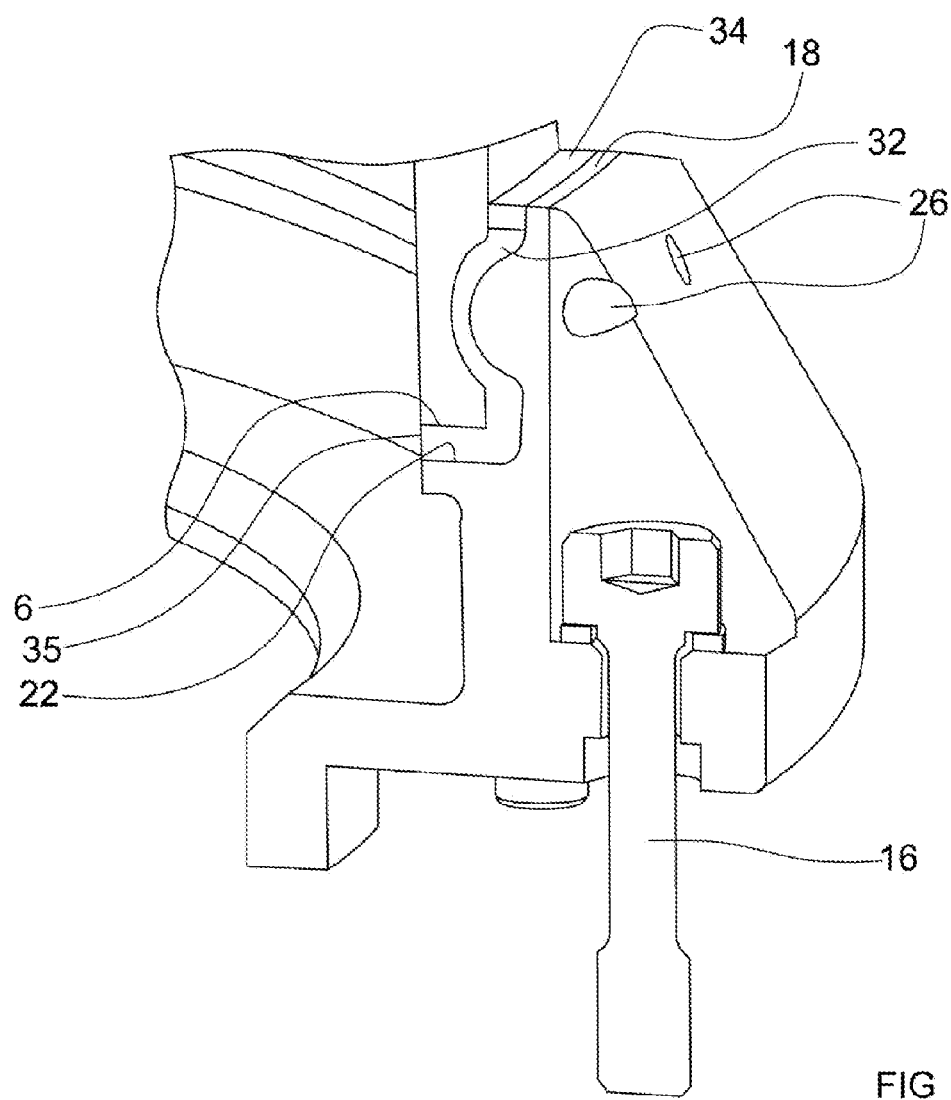
FIG. 7 is an enlarged view of the region VI of the arrangement shown in FIG. 6, and which shows the arrangement following the additional of a layer of sealant over the adhesive.

A flowable and curable adhesive 32 is then injected through the flow ports 26 and into the annular gap 29 between the edge region 5 of the dome 1 and the circular wall 17. The adhesive is preferably injected through the flow ports 26 under pressure and thus flows around the dome 1 so as to fill the gap 29, and also to fill the radial gaps 30 between the recesses 7 and their respective protrusions 23, as shown in FIG. 6. The adhesive also flows underneath the lower edge 6 of the dome to fill the gap between the edge 6 and the support surface 22. As will be noted, however, the upper level of the adhesive is spaced slightly below the upper edge 18 of the circular wall 17 which remains spaced from the outer surface of the dome 1 by a small annular gap 33 as shown in FIG. 5. T The adhesive is then at least partially cured so as to adhesively fix the dome 1 in position relative to the mount 9.

Following at least partial curing of the adhesive 30, a flowable sealant 34 is then flowed into the gap 33 between the edge 18 of the circular wall 17 and the outer surface of the dome 1. The sealant is provided to protect the adhesive 32 from damage and deterioration through exposure to possibly damaging atmospheric conditions outside the dome 1. At this point, and excess adhesive 32 which has leaked through the gap 31 beneath the lower edge 6 of the dome can be trimmed away to leave a clean edge 35 which is substantially flush with the inner surface of the dome 1, thereby leaving a clear aperture to the dome through the mount.

It is considered preferable to use an adhesive 32 which is substantially uncompressible (at least under anticipated normal service loads) when it is cured, in order to prevent relative movement between the dome 1 and the mount 9.

As will thus be appreciated, once the adhesive 32 is cured, it is effective to retain the dome 1 securely in position relative to the mount 9, whilst retaining a degree of positive retention arising from the engaged protrusions 23 and recesses 7, but without necessitating complicated mechanical fixing arrangements, and whilst also providing acceptable (and generally uniform) stress levels around the periphery of the dome 1. The lower edge 6 of the dome 1 is supported on the ring of adhesive which fills the gap 31 created between the edge 6 and the support surface 22 of the mount 9. This ring of adhesive thus acts in concert with the support surface 22 to prevent downwards axial movement of the dome 1 (in the orientation illustrated) relative to the mount 8. The dome 1 is furthermore prevented from moving sideways relative to the mount 9 by the adhesive filling the annular gap 29 between the lower edge region 5 of the dome and the circular wall 17 of the mount. The dome 1 is prevented from moving axially upwards relative to the mount 9 because of the manner in which the curved-profile protrusions 23 engage within the curved-profile recesses 7, and by the adhesive filling the curved/arcuate radial gaps 31 between the recesses 7 and the protrusions.

Whilst the present invention has been described above in detail and with specific reference to a particular embodiment, it is to be appreciated that various changes or modifications could be made without departing from the scope of the claimed invention. For example, it is envisaged that in variants of the invention, the recesses could be provided on the circular wall 17 of the mount instead of on the dome 1 and the protrusions could be provided on the dome 1 instead of the mount.

Also, whilst the invention has been described above in the context of an embodiment comprising an optical component in the form of a dome, and most preferably a hemispherical dome, it is to be noted that alternative embodiments are possible which incorporate an optical component of alternative shapes. For example, the optical component could be provided in the form of a convex or concave lens, or could be provided so as to have a conical shape. The important aspect is that the optical component has a circular edge region 5. Indeed, the rest of the optical component may not even have to be of a circular form itself.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A system for mounting an optical component in an optical arrangement; the system comprising:
   an optical component having a circular edge region; and
   a mount having a circular wall configured for radially-spaced cooperation with said circular edge region;
   the system being configured such that one of said circular edge region and said circular wall has a plurality of spaced-apart protrusions that protrude in a radial direction from said circular edge region or said circular wall; and
   the other of said circular edge region and said circular wall has a plurality of spaced-apart recesses that extend in a radial direction into said circular edge region or said circular wall,
   wherein said protrusions and said recesses are configured such that each protrusion may be aligned with a respective recess, and once each protrusion has been aligned with the respective recess, either the mount or the optical component or both can be then rotated about respective and coincident axes to cause relative rotation between the mount and the optical component, wherein said relative rotation is effective to move each protrusion into loose engagement within the respective recess,
   wherein the system is configured such that, when the optical component is mounted to the mount, there is a space between said circular edge region and said circular wall that extends along a circumferential path and separatus the circular edge region of the optical component from the circular wall of the mount in a radial direction, and
   wherein the system is configured such that when the optical component is mounted to the mount, each respective one of the protrusions extends in a radial direction into a corresponding, one of the recesses;
   the system further including an adhesive in the space that is between said circular edge region and said circular wall to adhesively fix the optical component in position relative to the mount.

2. A system according to claim 1, wherein each said protrusion and each said recess is substantially curved or arcuate in radial cross-section.

3. A system according to claim 1, wherein said circular wall defines a circular edge arranged to be spaced from a surface of said optical component by an annular gap, the system further comprising a sealant to fill said gap and protect said adhesive between the circular edge region and the circular wall.

4. A system according to claim 1, wherein said adhesive is substantially incompressible when cured.

5. The system of claim 1, wherein the plurality of spaced-apart protrusions and the plurality of spaced-apart recesses form a direct physical connection between the optical component, which is glass or a similar material, and the mount, with only the adhesive between the circular edge region of the optical component and the circular wall of the mount.

6. The system of claim 1, wherein each of the plurality of spaced-apart protrusions extends in an inward direction from the circular wall of the mount to engage a corresponding one of the plurality of spaced-apart recesses.

7. The system of claim 1, wherein the adhesive fills an annular gap between the edge region of the optical component and the circular wall of the mount and also fills the radial gaps between the recesses and their respective, protrusions.

8. The system of claim 1, wherein the optical component and the mount are rigid.

9. The system of claim 1, further configured such that when the optical component is mounted to the mount and the adhesive is in place between the optical component and the mount, the adhesive retains the optical component securely in position relative to the mount, the engaged protrusions and recesses positively retain the optical component to the mount while providing uniform stress levels around a periphery of the optical component,
   wherein a lower edge of the optical component is supported on a ring of adhesive which fills a gap between an edge and a support surface of the mount, wherein the ring of adhesive thus acts in concert with the support surface to prevent axial movement, of the optical component relative to the mount in a first axial direction,
   wherein the optical component is further prevented from moving sideways relative to the mount by portions of the adhesive filling the space between the circular edge region of the optical component and the circular wall of the mount, and
   wherein the optical component is prevented from moving axially relative to the mount in a second axial direction because of a manner in which the protrusions engage within the recesses and by the adhesive filling curved/arcuate radial gaps between the recesses and the protrusions.

10. The system of claim 1, wherein the space between the circular edge region of the optical component and the circular wall of the mount exists, in part, because an inner diameter of the circular wall is larger than an external diameter of the circular edge region.

11. The system of claim 1, wherein the protrusions are not springs.

12. A system according to claim 1, wherein at least one of said circular edge region of the optical component and said circular wall of the mount has a plurality of flow ports formed therethrough for the injection of said adhesive between said circular edge region and said circular wall.

13. A system according to claim 12, wherein at least some of the flow ports extend radially through the circular wall at spaced-apart positions around the circular wall.

14. A system according to claim 1, wherein each said protrusion is smaller in radial cross-section than the radial cross-section of the respective recess, such that a radial gap is created between the recess and the protrusion upon said relative rotation, said adhesive being provided to fill said radial gap.

15. A system according to claim 14, wherein each said radial gap is generally curved or arcuate in radial cross-section.

16. A system according to claim 1, wherein said optical component is a dome.

17. A system according to claim 16, wherein, said dome is hemispherical.

18. A system according to claim 16, wherein the inner surface of said dome is free of recesses or protrusions in said edge region.

19. The system of claim 1, wherein the adhesive completely fills a gap between said circular edge region said circular wall, including gaps between the recesses and their respective protrusions.

20. The system of claim 19, wherein the adhesive further fills a gap between a circular edge of the optical component and a support surface of the mount.

21. A system according to claim 1, wherein said recesses are provided in said edge-region of the optical component, and said protrusions are provided on said circular wall of the mount.

22. A system according to claim 21, wherein said recesses are provided in a radially outwardly directed surface of the optical component, and said protrusions project radially inwardly from said circular wall.

23. A system according to claim 21, wherein said recesses are spaced from a circular edge of said edge region, and each recess is associated with a respective recessed access channel formed in said edge region and extending from said circular edge to the recess, each access channel being configured to permit the passage of a respective said protrusion upon relative axial movement of the optical component and mount towards one another, to thereby align the protrusions with said recesses.

24. A system according to claim 23, wherein said mount defines a support surface configured to be spaced from said circular edge of the edge region by said adhesive.

25. A system according to claim 1, wherein the circular edge region is around a periphery of the optical component and terminates in a circular edge,
wherein the inner surface of the dome extends over an inner side of the circular edge region without discontinuity or deviation so as to be optically consistent with the rest of the optical component's inner surface,
wherein the circular edge region of the optical component is provided with the plurality of spaced-apart recesses around its outer periphery,
wherein each recess is formed in the material of the optical component and extends inwardly from the radially outwardly directed outer surface of the optical component.

26. A system according to claim 25, wherein the optical material is glass and the recesses are formed in the glass.

27. A system according to claim 26, in a missile guidance system or an infrared countermeasures system.

28. A method of mounting an optical component in an optical arrangement, the method comprising the steps of:
providing an optical component having a circular edge region, and a mount having a circular wall configured for radially-spaced cooperation with said circular edge region,
wherein one of said circular edge region and said circular wall has a plurality of spaced-apart protrusions that protrude in a radial from said circular edge region or said circular wall,
wherein the other of said circular edge region and said circular wall has a plurality of spaced-apart recess that extend in a radial diction into said circular edge region or said circular wall;
aligning each respective one of said protrusions with a respective one of said recesses; and
after each protrusion has been aligned with the respective one of the recesses, rotating either the mount or the optical component or bath about respective and coincident axes to cause relative rotation between the mount and the optical component, wherein said relative rotation is effective to move each protrusion into loose engagement within the respective one of the recesses;
wherein after each protrusion has been moved into loose engagement with the respective one of the recesses there is a space between circular edge region and said circular wall that extends along a circumferential path and separates the circular edge region of the optical component from the circular wall of the mount in a radial direction, and each protrusion extends in a radial direction into the respective one of the recesses;
applying an adhesive in the space between said circular edge region and said circular wall; and
at least partially curing said adhesive to fix the optical component in position relative to the mount.

29. A method according to claim 28, wherein each said protrusion and each said recess is substantially curved or arcuate in radial cross-section.

30. A method according to claim 28, wherein said circular wall defines a circular edge, and wherein the method involves spacing said circular edge from a surface of the optical component by an annular gap, and filling said annular gap with a sealant to protect the adhesive between the circular edge region, and the circular wall.

31. A method according to claim 28, wherein said adhesive is substantially uncompressible when cured.

32. A method according to claim 28, wherein said step of applying adhesive between the circular edge region and said circular wall is performed after said step of rotating either said optical component or said mount to engage each said protrusion within a respective said recess.

33. A method according to claim 32, wherein said step of applying adhesive involves injecting said adhesive between said circular edge region and said circular wall through a plurality of flow ports formed through at least one of said circular edge region and said circular wall.

34. A method according to claim 28, further comprising the step of centering the circular edge region with respect to the circular wail to define an annular gap of uniform thickness between the circular edge region and the circular wall, prior to said step of at least partially curing the adhesive.

35. A method according to claim 34, wherein said step of centering the circular edge region with respect to the circular wall is performed prior to said step of applying the adhesive between the circular edge region and the circular wall, said adhesive being applied in said annular gap.

36. A method according to claim 28, wherein each said protrusion is smaller in radial cross-section than the radial cross-section of the respective recess, and wherein said step of rotating either said optical component or said mount to cause relative rotation between said optical component and said mount involves the creation of a radial gap between each recess and its respective protrusion upon said relative rotation, said step of applying adhesive involving filling each said radial gap with adhesive.

37. A method according to claim 36, wherein each said radial gap is generally curved or arcuate in radial cross-section.

38. A method according to claim 28, including providing said optical component in the form of a dome.

39. A method according to claim 38, including providing said dome in the form of a hemispherical dome.

40. A method according to claim 38, wherein the inner surface of said dome is free of recesses or protrusions in said edge region.

41. A method according to claim 28, including providing said recesses in the edge region of the optical component, and said protrusions on the circular wall of the mount.

42. A method according to claim 41, including providing said recesses in a radially outwardly directed surface of the optical component, and said protrusions projecting inwardly from the circular wail of the mount.

43. A method according to claim 41, including providing said recesses in spaced relation to a circular edge of said edge region, each recess being associated with a respective recessed access channel formed in said edge region and extending from said circular edge to the recess, the method further involving moving the optical component and the mount axially towards one another such that each access channel permits the passage of a respective said protrusion, thereby aligning the protrusions with respective recesses.

44. A method according to claim 43, wherein said mount defines a support surface, said step of moving the optical component and the mount axially towards one another involves spacing the support surface from said circular edge of the edge region; and wherein said step of applying the adhesive involves the application of said adhesive between said support surface and said circular edge of the edge region.

45. A system for mounting an optical component in an optical arrangement; the system comprising:

an optical component made entirely of glass and having a circular edge region that terminates in a circular edge;

a plurality of spaced-apart recesses in a radially-outwardly directed surface of the glass at the circular edge region of said optical component, wherein the recesses extend in a radial direction into said circular edge region;

a mount having a circular wall configured for radially-spaced cooperation with said circular edge region;

a plurality of spaced-apart protrusions in a radially-inwardly directed surface on said circular wall of said mount, wherein the protrusions protrude in a radial direction from said circular wall;

wherein said protrusions and said recesses are configured such that each protrusion may be aligned with a corresponding one of said recesses, and once each protrusion has been aligned with the corresponding one of said recesses, either the mount or the optical component or both can be then rotated about respective and coincident axes to cause relative rotation between the mount and the optical component, wherein said relative rotation is effective to move each protrusion into loose engagement within the respective recess;

wherein the system is configured such that when the optical component is mount to the mount, there is a space between said circular edge region and said circular wall that extends along a circumferential path and separates the circular edge region of the optical component from the circular wall of the mount in a radial direction, and wherein the system is configured such that, when the optical component is mounted to the mount, each respective one of the protrusions extends in a radial direction into a corresponding one of the recesses;

wherein each of said recesses is spaced from the circular edge of said circular edge region and is associated with a respective recessed access channel formed in the glass at said edge region, wherein each of said access channels extends from said circular edge to a corresponding one of said recesses, wherein each access channel is configured to permit a corresponding one of the protrusions to pass into the corresponding one of the recesses by moving the optical component and the mount in an axial direction towards one another; and an adhesive between said circular edge region and said circular wall to adhesively fix the optical component in position relative to the mount.

46. The system of claim 45, wherein the optical component is made entirely of glass and wherein each of the plurality of spaced-apart recesses is formed in the glass.

* * * * *